Feb. 14, 1956  W. A. RAY  2,734,564
GAS-BURNER CONTROL SYSTEM
Filed June 29, 1953
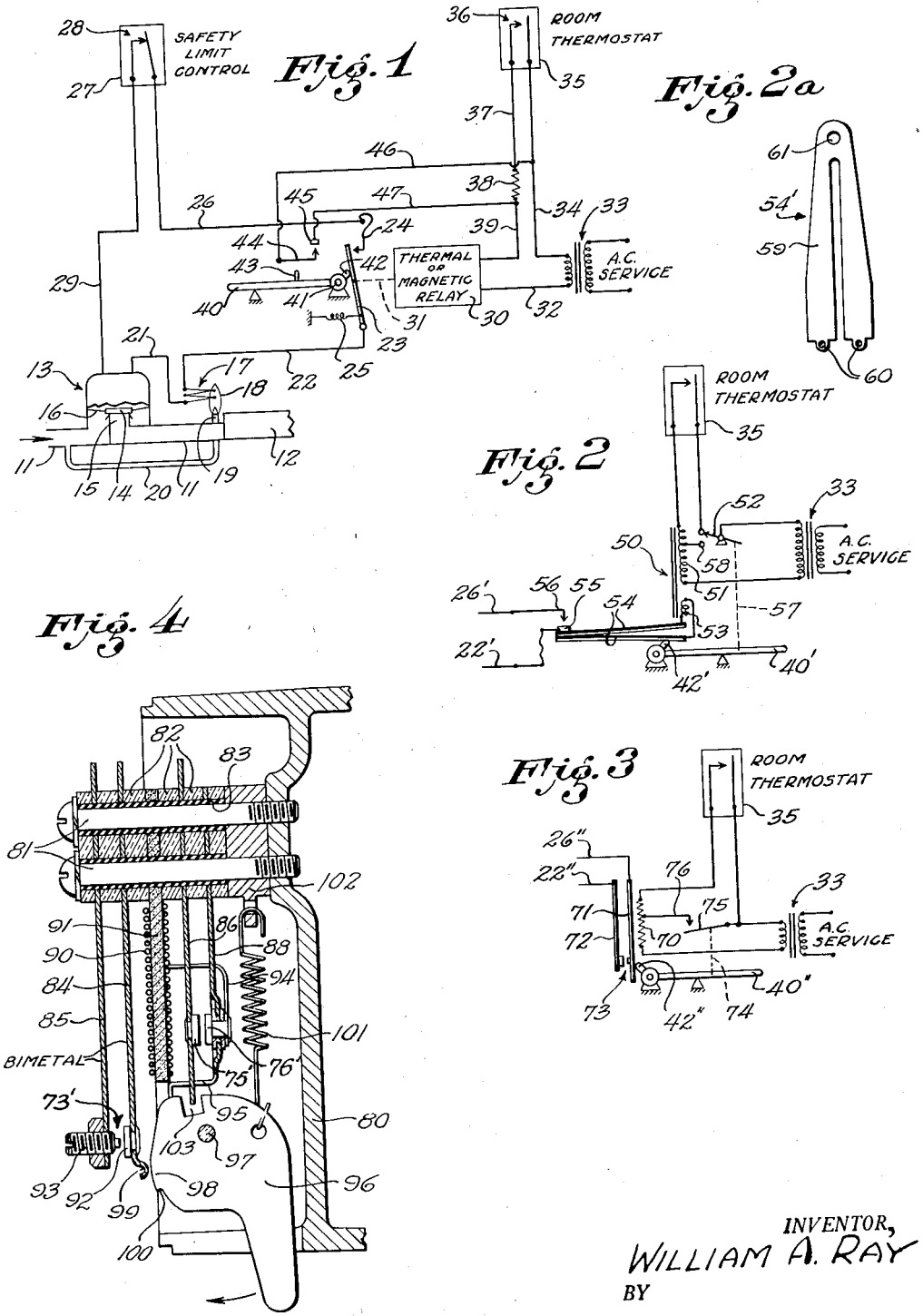
INVENTOR,
WILLIAM A. RAY
BY
John H. Rouse,
ATTORNEY.

United States Patent Office 2,734,564
Patented Feb. 14, 1956

2,734,564
GAS-BURNER CONTROL SYSTEM
William A. Ray, North Hollywood, Calif., assignor to General Controls Co., Glendale, Calif., a corporation of California
Application June 29, 1953, Serial No. 364,805
7 Claims. (Cl. 158—130)

This invention relates to electrically controlled gas-burner control systems, and more particularly to such systems wherein power for the primary or thermostatic control is derived from the electric service lines, as distinguished from a system wherein a thermoelectric generating device is employed as the sole source of electric energy.

One of the main advantages of employing power for the service lines for the primary control is that, with the relatively high voltage and large amount of power then available, the effect of resistance of long control lines and unsoldered connections, and the contact-resistance in the thermostat, is negligible, another advantage being the practicability of concurrent control of electrical means for circulating a heat-distributing medium such as air or water heated by the gas burner.

Inasmuch as supply of power from the service lines is subject to periodic failure or interruption, it has been customary to provide means for then opening the gas-supply valve manually and latching it in open position. But by so doing any safety means in the system depending on the external electric power for operation are rendered ineffective, and dangerous conditions may result from operation of the burner if the power failure is of more than brief duration.

It is therefore a main object of this invention to provide a system employing electric power from the service lines for primary control of the gas valve, but wherein the possibility of establishment of a dangerous condition is avoided both in normal operation of the system and when, during failure of the electric power, opening of the valve is effected manually.

I accomplish the aforementioned object by providing a system having two separate electric circuits, one of the circuits including an electrically controlled normally-closed main-burner valve, a thermoelectric generating device activated by the flame of a pilot burner and capable of energizing the valve to open position, and a switch for normally controlling this circuit, as well as a safety device, responsive to a condition resulting from operation of the main burner, capable of effecting deenergization of the valve; the other circuit comprising a relay for actuating said switch, a source of electric power from the service lines, and a primary control or room thermostat.

In addition, I provide (instead of means for manually opening the valve) manually operable means for actuating said switch so that, during failure of the external power, opening of the valve can be effected manually—provided that the pilot burner is light, and the condition (such as furnace temperature or boiler pressure) to which the safety device is responsive, is normal.

In the prior-art systems referred to above (such as that disclosed in my Patent No. 2,622,622) wherein the valve itself is manually set to open position during power failure, the only way in which the valve can close automatically is by unlatching of the manual setting means upon resumption of electric service. On the other hand, in the system of this invention wherein the switch (normally actuated by the relay) is manually set during power failure, the valve will close (prior to resumption of electric service) if the safety device calls for such action, or if the pilot burner becomes extinguished.

Moreover, in the prior-art systems the valve can be manually set to open position during power failure regardless of whether or not safe conditions exist; whereas in the system of this invention manual setting of the switch during power failure, or while the room-thermostat is open, cannot effect opening of the valve unless the burner system is then "safe."

For full understanding of the invention, and further appreciation of its objects and advantages, reference is to be had to the following detailed description and accompanying drawing, and to the appended claims.

In the drawing:
Figure 1 is a diagram of a gas-burner control system embodying this invention;
Figure 2 is a diagram showing a switch-actuating thermal relay for controlling a valve circuit such as that shown at the left in Fig. 1;
Figure 2a is an elevation of a preferred form of bimetallic loop adapted for use in the thermal relay shown in Fig. 2;
Figure 3 is a diagram showing another form of thermal relay; and
Figure 4 is a sectional view of a practical embodiment of the thermal relay shown in Fig. 3.

Referring first more particularly to Fig. 1 of the drawing, the numeral 11 indicates a conduit which, it is to be assumed, is connected at its open end to a source of fuel gas, the conduit being connected at its other end to a main burner 12. In this conduit is a valve structure, generally indicated at 13, which comprises a closure 14 cooperable with a valve port 15 and biased to port-closing position. In the upper part of the valve structure, above a flexible diaphragm 16 for guiding the closure, are electrical means (not shown) which are effective when energized to raise the closure to port-opening position. These electrical means may be of the sensitive electromagnetic type adapted to act on closure 14 either directly, or indirectly through a pilot valve controlling the fluid pressure on opposite sides of the diaphragm 16, typical examples of which are disclosed in my Patents No. 2,358,828 and No. 2,294,693, respectively.

For energizing valve 13 there is a thermoelectric generating device 17 comprising a plurality of thermocouples whose hot-junctions are in the flame 18 of a pilot burner 19, for igniting the main burner, which is connected by a pipe 20 to conduit 11 ahead of the valve. One terminal of device 17 is connected by a wire 21 to one terminal of valve 13, the other terminal of the device being connected by a wire 22 to a rockable switch-arm 23 which cooperates with a relatively-fixed contact blade 24 and is biased out of engagement therewith by a spring 25. The fixed contact 24 is connected by a wire 26 to one terminal of a safety limit control 27 which may be of any convenient type and is arranged to respond to a condition, such as furnace temperature or boiler pressure, resulting from the operation of the main burner 12, the limit control having normally-closed contacts 28 which open upon establishment of an abnormal degree of said condition. The energizing circuit for valve 13 is completed by a wire 29 interconnecting the remaining terminals of the limit control and the valve.

For automatically actuating the switch 23—24 there is an electric relay 30 which may be of any suitable thermally-operated or electromagnetically-operated type and is operatively connected to switch-arm 23 as indicated by the broken line 31. One terminal of the relay is connected by a wire 32 to the secondary of a step-down transformer 33 whose primary is connected to the A. C. electric service lines. From the secondary of the transformer another wire 34 leads to one terminal of a conventional thermostat 35 responsive to heat produced by the main burner and having contacts 36, the other terminal of the thermostat being connected to the remaining terminal of the relay through a wire 37, a resistor 38 and another wire 39. The purpose of resistor 38 will be described in connection with operation of the system during and subsequent to power-failure.

In operation of the system while A. C. service exists, closing and opening of the room-thermostat contacts in accordance with heating requirements normally effects, through relay 30, corresponding closing and opening of switch 23—24 and resultant opening and closing of valve 13 to control supply of gas to the main burner—provided that the contacts 28 of the limit control are closed and the pilot burner is alight, it being apparent that in the absence of these conditions closing of switch 23—24 could not effect opening of the valve.

If means for circulating air or water heated by the main burner is provided, concurrent control of such means may be effected by additional switching means arranged for actuation by the relay.

While the limit control 27 is shown as being of the preferred type having normally-closed contacts, it is to be understood that in a circuit energized by a thermo-electric device capable of generating only a small amount of energy, it is practicable to employ a limit control having normally-open contacts connected in parallel with either the valve 13 or the generating device 17, so that deenergization of the valve results when the limit-control contacts close upon establishment of an abnormal degree of the condition to which the limit control responds. The control switch 23—24 could likewise be arranged in shunt with the generating device or the valve, so that the valve is deenergized when the switch closes. An arrangement of this kind is disclosed in Patent No. 2,164,694.

For actuating switch 23—24 independently of the relay 30, as during power failure, there is a manually operable lever 40 pivoted at 41 and having a projection or cam 42 against which the switch arm 23 normally rests. By raising this lever the switch arm is rocked into engagement with contact blade 23, so that valve 13 then opens provided that the limit control 27 is then in "safe" position and the generating device 17 is active due to the existence of flame at the pilot burner. While relay 30 is unenergized, friction between cam 42 and the switch arm retains the manual lever in raised position and switch 23—24 set in closed position.

When lever 40 is raised as described, a projection 43 on the lever engages a switch blade 44 and moves it into engagement with a fixed contact 45. The blade 44 and contact 45 are connected by wires 46 and 47 to the wires 34 and 39, respectively, so that when switch 44—45 is closed there is a low-resistance circuit (independent of resistor 38) interconnecting relay 30 and the secondary of transformer 33 which ensures such powerful operation of the relay upon resumption of the electric service that switch arm 23 is moved out of engagement with cam 42 to permit lever 40 to drop to normal position by gravity; contact blade 24 being yieldable to permit sufficient movement of switch arm 23 by the relay. It is to be understood that the value of resistor 38 is such that, in normal operation of the system, there is adequate current for actuation of switch 23—24 by the relay when the room thermostat closes.

In Fig. 2 of the drawing I have shown a switch-actuating thermal relay system adapted for controlling the thermoelectrically-energized valve circuit shown at the left of Fig. 1. This system comprises a heating transformer 50 the whole of whose primary winding 51 is normally connected in series with the room thermostat 35 and line transformer 33 through a pivoted switch-arm 52, the heating transformer having a low-resistance secondary winding 53 connected to one end of each of a pair of bimetallic strips 54 which are joined together at their other ends, as by welding, to form with winding 53 a continuous series circuit. When upon closing of the room thermostat the primary winding 51 is energized, current is induced in winding 53 and flows through the bimetallic strips, causing them to heat and flex so that a contact 55 carried by the strips engages a fixed contact 56. The contacts 55 and 56 are connected to wires 22' and 26' which correspond to wires 22 and 26 in Fig. 1. For closing the switch 55—56 manually upon power failure there is a pivoted lever 40' which when raised effects through a cam 42' flexing of the bimetallic strips and closing of the switch. Raising of lever 40' also effects, through a connection indicated by a broken line 57, movement of switch arm 52 to a tap 58 on the primary winding 51 so that upon resumption of A. C. service a larger amount of current flows in the heating transformer 50 to effect prompt release of the manual lever.

Fig. 2a shows a preferred form of switching member adapted for use in the thermal relay of Fig. 2. This member (generally indicated by numeral 54' to correlate it with strip 54 in Fig. 2) consists of a flat strip of bimetallic material which is bifurcated to form a loop 59 having terminals 60 for connection of the winding 53, and an opening 61 at the fork of the loop for receiving the contact element.

In Fig. 3 I have shown another thermal relay system adapted for controlling the valve circuit of Fig. 1 and having leads 22" and 26" corresponding to the wires 22 and 26 in that circuit. In this system there is a heating resistor or coil 70 the whole of which is normally connected in series with room thermostat 35 and line transformer 33. Arranged to receive heat radiated by coil 70 is a bimetallic strip 71 which when thus heated flexes toward a second bimetallic strip 72 to effect interengagement of contacts 73 carried by the strips. The second bimetallic strip 72 (arranged to flex in the same directions as strip 71) is heated only indirectly and to a lesser degree than strip 71 so that the contacts 73 remain interengaged while heater 70 is energized, this arrangement having the advantage that, even after prolonged heating, prompt separation of the contacts occurs when the heater is deenergized upon opening of the thermostat. For closing the switch contacts 73 manually upon power failure there is an arrangement similar to that shown in Figs. 1 and 2 and comprising a lever 40" having a cam 42" cooperable with the bimetallic strip 71. Raising of lever 40" effects, through cam 42", closing of contacts 73 and also, through a connection 74, movement of a switch arm 75, connected to the thermostat terminal of the line transformer, into engagement with a contact 76 connected to a tap on the heating coil, so that upon resumption of electric service a relatively large amount of current flows from the transformer through the tapped portion of the heating coil to effect prompt release of the manual lever.

The structure shown in Fig. 4 is a practical embodiment of the thermal relay shown diagrammatically in Fig. 3. In Fig. 4 the numeral 80 indicates a housing which, in practice, forms part of a structure which includes an electrically operable valve corresponding to the valve 13 shown in Fig. 1. Secured to the floor of the housing by a pair of screws 81 is a stacked assembly whose components are insulated from each other and from the screws by two-hole insulating washers 82 and sleeves 83. This assembly includes a pair of bimetallic strips or blades 84 and 85 which correspond respectively to the bimetallic strips 71 and 72 in Fig. 3; as well as a flexible contact strip 86 and associated contact element 75', and a rigid metal strip 88 which insulatingly supports another contact element 76', contact elements 75' and 76' corresponding respectively to the switch parts 75 and 76 in Fig. 3.

Adjacent the bimetallic blade 84 is a heating coil 90, wound around a flat support 91 of material such as micas secured to the housing by the screws 81, which when energized effects flexing of blade 84 so that its contact 92 engages an adjustable contact 93 on blade 85 to complete a control circuit such as that of valve 13 in Fig. 1. Contacts 92 and 93 are generally indicated by numeral 73' to correlate them with contacts 73 in Fig. 3. The blade 85, being of bimetal and arranged to flex in the same direction as blade 84 when heated, produces a compensating effect as was described in connection with the similar arrangements in Fig. 3. The end terminals of coil 90 are not visible since they are at the back of the structure. Coil 90 has a tap, as in the arrangement of Fig. 3, which is connected by a wire 94 to the insulated contact element 76'. At its lower end the strip 88 has a bent portion 95 which is attached to the lower portion of the mica strip 91 to further support the same, the setup portion 95 being slotted to provide clearance for contact strip 86. The strip 88 is preferably relatively wide and polished to reflect heat toward blades 84 and 85.

For closing the control contacts 92, 93 and the heater-tap contacts 75', 76' manually, there is a lever 96 which is pivoted on a pin 97 fixed to the housing and has a cam portion 98 which extends through a slot in the lower part of the mica strip and is engageable, when the lever is rocked in the direction of the arrow, with a projection 99 at the bottom of the bimetallic blade 84, which projection cooperates with a shoulder 100 below the cam portion to latch the lever in rocked position (while the heating coil is unenergized) against the force of a tension spring 101 urging the lever in the opposite direction and connected between it and a spacer 102 mounted between the housing and the switching assembly. The lever 96 has a notch 103 into which the bottom of contact strip 86 extends so that it is engaged by the left side-wall of the notch in manual operation of the lever to effect closing of contacts 75', 76'.

While the burner system to which this invention relates is customarily under the control of a thermostat, it is apparent that other automatic primary control devices, such as a time switch, could be employed.

The invention as illustrated and described is obviously susceptible of modification without departing from the spirit of the invention, and I intend therefore to be limited only by the scope of the appended claims.

I claim as my invention:

1. In a gas-burner control system: a main burner; a conduit for supplying gas to said main burner; an electrically-controlled normally-closed valve in said conduit for controlling said supply of gas to the main burner; a pilot burner for igniting the main burner and connected to the conduit ahead of said valve; a thermo-electric generating device activated by the flame of said pilot burner and capable of energizing said valve to effect opening of the same; a switch for normally controlling said energization of the valve; a first electrical circuit including said valve, said generating device and said switch; a safety device, responsive to a condition resulting from the operation of said main burner, also controlling said first circuit and acting to effect deenergization, and resultant closing, of said valve upon establishment of an abnormal degree of said condition; electrical relay means for actuating said switch so as normally to effect opening of said valve; a conventional source of electric power for energizing said relay means; an automatic primary circuit control device; and a second electrical circuit interconnecting said relay means, said source and said primary control device in series; all whereby, if said electric source is active the closing of said second circuit by said primary control device effects actuation of said first-circuit switch and resultant energization of said valve so that it opens, provided that said pilot burner is alight and said condition is normal; means for manually actuating said switch in the event of failure of the electric power source; and means rendered operable upon manually actuating said switch and adapted to return the switch to unactuated position upon restoration of power.

2. A gas-burner control system as defined in claim 1, and including means, controlled by said means for returning said switch to unactuated position and connected to said second circuit, for increasing beyond normal the amount of electric power supplied to said relay means upon restoration of the power.

3. In a gas-burner control system: a main burner; a conduit for supplying gas to said main burner; an electrically-controlled valve in said conduit for controlling said supply of gas to the main burner and biased to closed position; a pilot burner for igniting the main burner and connected to the conduit ahead of said valve; a thermo-electric generating device activated by the flame of said pilot burner and capable of energizing said valve to effect opening of the same; a switch for normally controlling said energization of the valve and biased to open position; a first electrical circuit including said valve, said generating device and said switch in series; a safety device, responsive to a condition resulting from the operation of said main burner, having switching means also controlling said first circuit and acting to effect deenergization, and resultant closing, of said valve upon establishment of an abnormal degree of said condition; electrical relay means for actuating said switch to closed position so as normally to effect opening of said valve; a source of electric power, subject to periodic failure, for energizing said relay means; a thermostat circuit control device responsive to heat produced by said main burner; and a second electrical circuit interconnecting said relay means, said source and said thermostat control device in series; all whereby, if said electric source is active the closing of said second circuit by said thermostat control device effects closing of said first-circuit switch and resultant energization of said valve so that it opens, provided that said pilot burner is alight and said condition is normal; manually operable means for closing said switch in the event of failure of the electric power source and for then latching the switch in closed position; means, including additional switching means actuated upon manually actuating said switch, for establishing an energizing circuit for said relay means independent of said thermostat; and means, operated by said relay means when energized upon restoration of the power, for effecting unlatching of said switch.

4. A gas-burner control system as defined in claim 3, and wherein said independent energizing circuit for said relay means includes means for increasing beyond normal the amount of electric power supplied to said relay means upon resumption of said power source.

5. A gas-burner control system as defined in claim 3, and wherein said safety-device switching means is normally-closed and connected in series with the components of said first electrical circuit, and said safety device is arranged to effect opening of said switching means upon establishment of an abnormal degree of said condition.

6. A gas-burner control system as defined in claim 3, and wherein said first-circuit switch comprises a thermally-responsive switching element, and said electrical relay means comprises means for heating said element.

7. A gas-burner control system as defined in claim 3, and wherein said first-circuit switch comprises a pair of bimetallic switching blades both adapted to move in the same direction when heated, and arranged so that interengagement of the blades is effected when one of the blades is heated to a higher degree than the other; and said electric relay means comprises means for so heating said blades as to effect said interengagement.

References Cited in the file of this patent

UNITED STATES PATENTS

| 1,821,512 | Hastings | Sept. 1, 1931 |
| 2,437,894 | Ray | Mar. 16, 1948 |
| 2,652,110 | Main | Sept. 15, 1952 |
| 2,661,013 | Eskin et al. | Dec. 1, 1953 |